United States Patent
Hsiao et al.

(10) Patent No.: US 9,875,258 B1
(45) Date of Patent: Jan. 23, 2018

(54) GENERATING SEARCH STRINGS AND REFINEMENTS FROM AN IMAGE

(71) Applicant: A9.com, Inc., Palo Alto, CA (US)

(72) Inventors: Edward Hsiao, Sunnyvale, CA (US); Douglas Ryan Gray, Redwood City, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 14/973,578

(22) Filed: Dec. 17, 2015

(51) Int. Cl.
*G06K 9/62* (2006.01)
*G06F 17/30* (2006.01)
*G06N 3/08* (2006.01)

(52) U.S. Cl.
CPC .. *G06F 17/30277* (2013.01); *G06F 17/30253* (2013.01); *G06F 17/30256* (2013.01); *G06F 17/30259* (2013.01); *G06F 17/30271* (2013.01); *G06F 17/30554* (2013.01); *G06F 17/30864* (2013.01); *G06F 17/30976* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 6,460,032 | B1* | 10/2002 | Ludtke | H04L 12/2805 |
| 2004/0249809 | A1* | 12/2004 | Ramani | G06F 17/30259 |
| 2008/0212899 | A1* | 9/2008 | Gokturk | G06F 17/30259 |
| | | | | 382/305 |
| 2009/0307629 | A1* | 12/2009 | Horiuchi | G06F 3/04817 |
| | | | | 715/810 |
| 2010/0121834 | A1* | 5/2010 | Ahola | G06F 17/30522 |
| | | | | 707/708 |
| 2011/0137921 | A1* | 6/2011 | Inagaki | G06F 17/3069 |
| | | | | 707/749 |
| 2012/0158686 | A1* | 6/2012 | Hua | G06F 17/30268 |
| | | | | 707/706 |
| 2014/0006385 | A1* | 1/2014 | Ebers | G06F 17/30274 |
| | | | | 707/722 |

(Continued)

OTHER PUBLICATIONS

Bai, Yalong, et al. "Bag-of-words based deep neural network for image retrieval." Proceedings of the 22nd ACM international conference on Multimedia. ACM, 2014.*

(Continued)

*Primary Examiner* — Andrae S Allison
(74) *Attorney, Agent, or Firm* — Hogan Lovells US LLP

(57) ABSTRACT

Approaches include using a machine learning-based approach to generating search strings and refinements based on a specific item represented in an image. For example, a classifier that is trained on descriptions of images can be provided. An image that includes a representation of an item of interest is obtained. The image is analyzed using the classifier algorithm to determine a first term representing a visual characteristic of the image. Then, the image is analyzed again to determine a second term representing another visual characteristic of the image based at least in part on the first term. Additional terms can be determined to generate a description of the image, including characteristics of the item of interest. Based on the determined characteristics of the item of interest, a search query and one or more refinements can be generated.

17 Claims, 10 Drawing Sheets

(56) References Cited

U.S. PATENT DOCUMENTS

| 2014/0074852 A1* | 3/2014 | Sud .................. G06F 17/30864 |
| | | 707/741 |
| 2016/0267326 A1* | 9/2016 | Yagev .................. G06K 9/4647 |
| 2016/0267637 A1* | 9/2016 | Hsiao .................... G06T 7/0002 |

OTHER PUBLICATIONS

Mohedano, Eva, et al. "Bags of local convolutional features for scalable instance search." Proceedings of the 2016 ACM on International Conference on Multimedia Retrieval. ACM, 2016.*

Chatfield, Ken, et al. "On-the-fly learning for visual search of large-scale image and video datasets." International journal of multimedia information retrieval 4.2 (2015).*

Donahue et al, Long-term Recurrent Convolutional Networks for Visual Recognition and Description, http://www.eecs.berkeley.edu/Pubs/TechRpts/2014/EECS-2014-180.html, Nov. 17, 2014.*

* cited by examiner

GENERATING SEARCH STRINGS AND REFINEMENTS FROM AN IMAGE

BACKGROUND

Users are increasingly utilizing electronic devices to obtain various types of information. For example, a user wanting to obtain information about an object can capture an image of the object and upload that image to an identification service for analysis. The identification service can analyze the image to obtain information associated with the object represented in the image and to identify the object as belonging to a certain object category (e.g., cameras, shoes). However, it remains a challenge to enable computing devices to identify additional information of the object beyond the object category. Thus, users can have difficulty locating the appropriate objects, or may at least have to navigate through many irrelevant results before locating the item of interest. Conventional approaches include displaying more results to the user and allowing the user to apply filters to the results. Such approaches usually rely on the user to identify the most relevant results. In such scenarios, identifying specific features of the object can increase the precision of the results.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for identifying content represented in an image. In particular, various embodiments utilize a machine learning-based approach to identify an item represented in an image to generate a search string and one or more refinements that can be used as inputs to a search query at an electronic marketplace or other such entity to search the electronic marketplace for the item. For example, a classifier trained to determine key words that describe objects represented in an image can be used to analyze an image of an item of interest to determine a description of the image, including a description of the item. Using this description, a search query and refinements can be generated that include the key words to search an electronic marketplace for the item. Use of the search query and refinements can increase the similarity of search results to the item.

In accordance with various embodiments, a first classifier and a second classifier are provided. The first classifier is trained on categories of objects (e.g., clothes, shoes, jewelry, cameras, etc.), and the second classifier is trained on descriptions of images. An image that includes a representation of an item of interest is obtained. The image is analyzed to determine a category for the item of interest. The image is then analyzed to determine a string of terms describing the image, including visual characteristics of the item of interest. The description of the image is used to generate a search string query, as well as one or more refinements and one or more key words. A search of an electronic marketplace using the search string query, refinements, key words, and category as parameters is performed, and a set of search results are determined. The search results can be displayed on a client device, and a user of the client device can select whether to apply the category, refinements, and key words to the search results to alter which search results are displayed. Advantageously, such approaches allow for refining search results based on characteristics determined from the query image to provide search results that the user will be more likely to view and/or purchase. Such an approach generally improves the user's experience and helps the user more quickly locate items of interest.

Various other functions and advantages are described and suggested below as may be provided in accordance with the various embodiments.

Figure 1A:
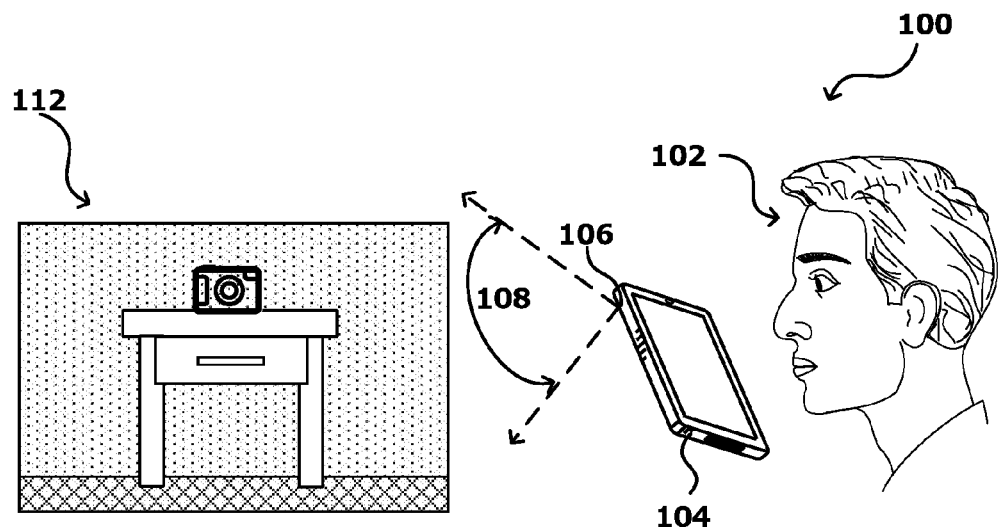
FIGS. 1A-F illustrate an example process in which a user can attempt to capture an image in an attempt to locate information about specific items represented in the image in accordance with various embodiments.

FIG. 1A illustrates an example situation 100 in which a user 102 is attempting to locate and purchase one or more specific items 112 in accordance with various embodiments. In this example, the user 102 would like to purchase a specific item 112, a camera. To purchase the item 112, the user 102 may choose to search an electronic marketplace for the item 112. The specific item 112, however, may be difficult or tedious for the user 102 to describe. Additionally, typing a description of the item 112 can be cumbersome or error prone for the user 102, particularly when the user 102 attempts to search for the item 112 on the small screen of a portable computing device 104. Further, the user's search for the item 112 may not return relevant results. For example, in another example, a user 102 may see a specific shoe that the user would like to purchase. If the user searches for "high heels with flower pattern, strapless and jewels on the side," search results can include bracelets rather than shoes. To address some of these challenges, a user 102 can search the electronic marketplace using an image of the item of interest 112. For example, the user 102 can take a photo of the camera 112 or otherwise obtain an image including a representation of the camera 112 that can be used as an input to a search query. To perform such a search for the item 112 represented in an image, the electronic marketplace can identify an object category to which the item 112 belongs (e.g., shoes, cameras) based on a mobile query image, such as that illustrated in FIG. 1B. The electronic marketplace's catalogue then can be searched for the object category.

Although a portable computing device 104 (e.g., a smart phone or tablet computer) is shown in FIG. 1A, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user 102 can position the device 104 such that one or more items of interest 112 are within a field of view 108 of the at least one camera 106 on the computing device 104. Here, the item of interest 112 is a camera. The camera 106 on the computing device 104 might capture video, such that a "live" view of the captured video information can be displayed on a display screen 132 of the computing device 104, as illustrated in the example situation 120 of FIG. 1B. In other embodiments, the camera 106 might capture a still image 134 showing a representation of the item(s) of interest. In yet other embodiments, the image can be obtained in any one of a number of different ways, as may include downloading or otherwise obtaining the image. In at least some embodiments, the image and/or a frame of the video can be analyzed, such as by analyzing on the device or uploading across a network to a service for analyzing image content.

Figure 1B:
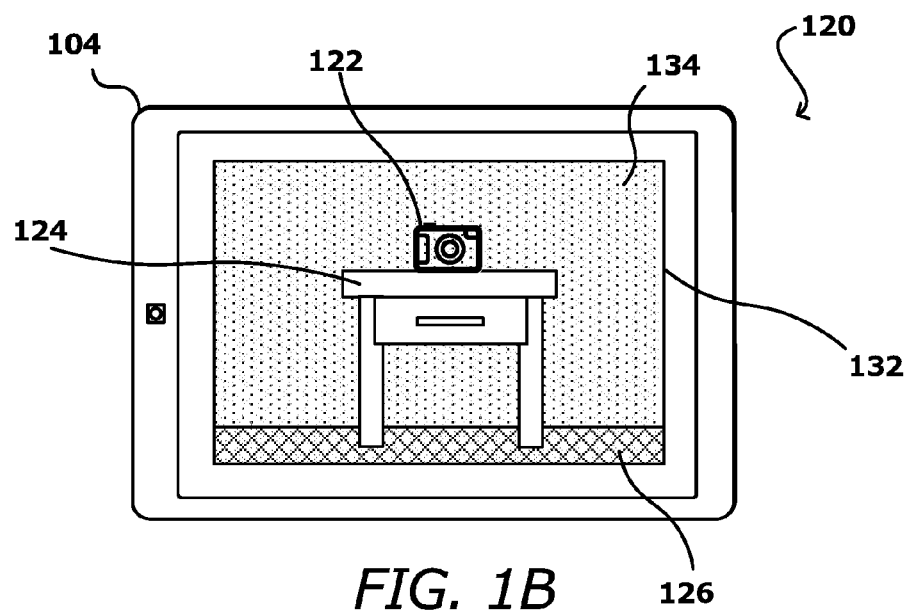

Unfortunately, attempting to recognize and search for an item based on a mobile query image such as that illustrated in FIG. 1B can be difficult. For example, it can be difficult to identify specific features of an item of interest to the user beyond the item's general category. Thus, it can be difficult to enable a user to search an electronic marketplace for the particular item of interest, rather than merely its object category (e.g., cameras, shoes, tables). For instance, in the example image 134, there is a camera 122 on a table 124 and a rug 126, as well as other items represented in the image. A user may attempt to purchase the camera 122 depicted in the example image 134. The user can use the image 134 to search an electronic marketplace. Further, the user or the electronic marketplace can submit the image 134 to an object recognition system to obtain information associated with the camera 122. For example, the electronic marketplace can analyze the image 134 to determine that the depicted object is part of the object category "cameras" and perform a search of its catalogue using "cameras" as the search query. A search of an electronic marketplace for the object category "cameras" based on the image 134 may not produce search results similar to the specific camera of interest, however. For example, the user may be interested only in cameras with certain features, such as a particular brand, a particular capability, a particular size, or a particular price point. The user can review a long list of search results to identify those results more closely related to the item of interest. Such a process can be time consuming and potentially frustrating for a user, which can result in the user's not locating the item of interest and the marketplace's not completing a transaction.

Accordingly, various embodiments utilize a machine learning-based approach to identify an item represented in an image to generate a search string and one or more refinements that can be used as inputs to a search query at an electronic marketplace or other such entity to search an electronic marketplace for the item. As a first step, a neural network-based approach can be used to train a classifier algorithm to categorize an item of interest represented in an image and provide labels or other descriptors that describe characteristics of the image, including characteristics of the item. Examples of machine learning include neural networks, principal component analysis (PCA), support vector machines (SVM), inductive learning, adaptive boosting, and deep learning, among others. For instance, deep learning involves modeling high-level abstractions in data using multiple non-linear transformations. Deep learning techniques are based on the premise that images can be represented in many ways but, from exemplars, certain representations can make it easier to learn tasks of interest, such as object classification of an object represented in an image. Deep learning techniques include deep neural networks, convolutional deep neural networks, and deep belief networks. As will be apparent to persons of reasonable skill in the art, any number or combination of classification approaches can be applied herein.

As mentioned, machine learning approaches can include neural network-based approaches. Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the auto-associative neural network, the probabilistic decision-based neural network (PDBNN), and the sparse network of winnows (SNoW).

As would be understood to one skilled in the art, neural networks consist of multiple layers of neuron collections which look at portions or regions of the input image, called receptive fields. A neuron (or unit) can be a mathematical function. Neurons are the constitutive units in an artificial neural network. The neuron receives one or more inputs such as portions of an image and sums them to produce an output. Usually the sums of each node are weighted, and the sum is passed through a non-linear function known as an activation function or transfer function. The transfer functions usually have a sigmoid shape, but they may also take the form of other non-linear functions, piecewise linear functions, or step functions. They are also often monotonically increasing, continuous, and bounded.

An example neural network is a convolutional neural network (CNN). Convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling.

Convolutional networks may include local or global pooling layers, which combine the outputs of neuron collections. They also consist of various combinations of convolutional layers and fully-connected layers, with point-wise nonlinearity applied at the end of or after each layer. The results of the neuron collections are then tiled so that they overlap to obtain a better representation of the original image and this process is repeated for each layer.

Convolutional layers, for example, have well defined receptive fields. In accordance with various embodiments, these fields can operate on a specific region of the image, while the layers operate on the entire image. The size of the receptive field is a property of the units that make up the layer to which the region is associated with and not a property of the convolutional network. As such, the size of the receptive field is independent of the size of the input image. In this way, if the input image were to grow in size, then the layer would also grow by adding more units of the same type at its edges. Further, as is understood in the art, a notion of location in the original image is retained for convolutional layers throughout the convolutional network. Each particular unit has a receptive field that is defined in shape and size and resides at a specific location in the original image, and if the size of the input is increased, each output can be associated to a specific proposal region.

In each convolutional layer, the convolutional network uses a shared weight, and each layer will compute the output of neurons that are connected to local regions (i.e., receptive fields) in the input, where each neuron computes a dot product between their weights and the region (i.e., receptive field) they are connected to in the input. In this way, each neuron looks at a specific region (i.e., receptive field) of the image and outputs one number: the dot product between its weights and the pixel values of in its region (i.e., receptive field). Fully-connected layers, for example, operate on the entire input and the receptive field size is defined as the entire image. Regions of the image feed into all units of the layer.

There are several types of layers of neurons in a neural network. As mentioned, in a fully connected layer every unit of its input is connected to every unit of the output. This layer is therefore very dense and often contains a very large number of parameters. Effective regularization techniques such as drop-out are used for such layers during the training process. To deal with images, which have very high dimensions, convolutional networks introduce convolutional and pooling layers. A convolution layer differs from a fully connected layer primarily in weight sharing. Weight sharing drives down the number of parameters in a layer significantly, making the network more efficient and helping to avoid over-fitting.

Another type of neural network is a recurrent neural network (RNN). RNNs can map input sequences to a sequence of hidden states to learn complex temporal dynamics. An RNN can have an input word layer, a recurrent layer, and an output layer in each time frame. Activation of the input layer at a given time can be a current word vector. RNNs can generate words or characters one at a time to predict string descriptions of an image, for example. RNNs can be capable of determining which parts of an image are more discriminative for a given category and can learn which parts of an image on which to focus to predict each of the words in a caption or other description sequence, such as a search string sequence.

Figure 1C:
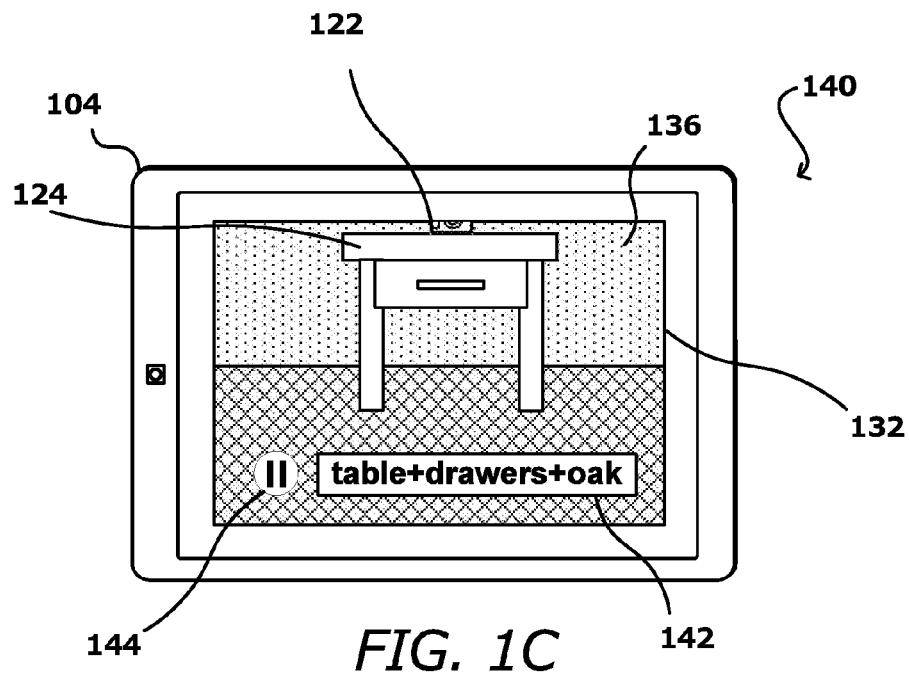
Figure 1D:
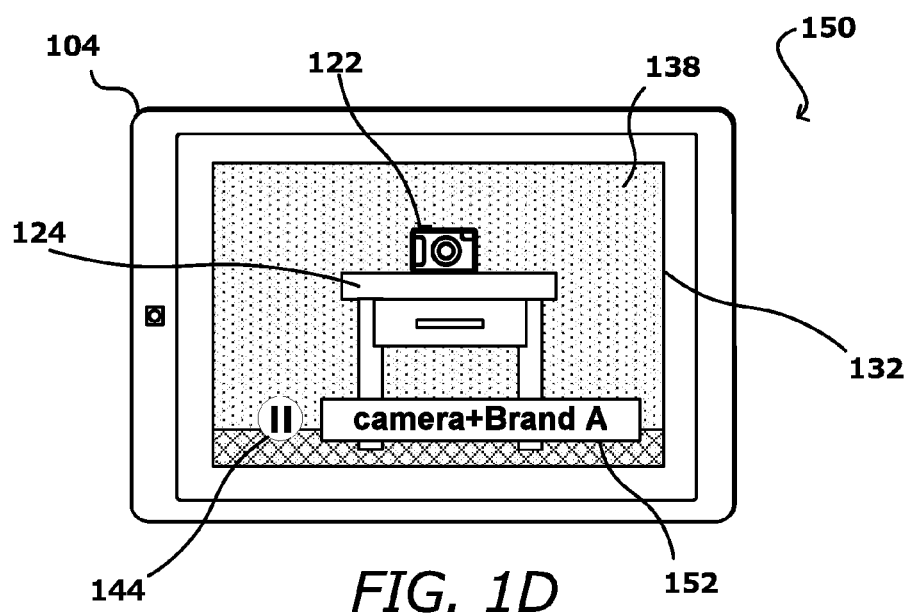

Accordingly, approaches in accordance with various embodiments utilize a first classifier that is trained on categories of objects (e.g., clothes, shoes, jewelry, cameras, etc.) and a second classifier that is trained on descriptions of images. An image is obtained that includes a representation of an item of interest. For example, such an image can be a still image 134 showing a representation of the item(s) of interest, such as the camera 122. As an alternative to using a still image 134, a "live" image representing objects currently in the field of view 108 of the camera 106 of a computing device 104 can be used, such as image 136 illustrated in FIG. 1C or image 138 illustrated in FIG. 1D. The image is analyzed using the first classifier to determine a category for the item of interest. The image is then analyzed using the second classifier to determine a string of terms describing the image. The description of the image is used to generate a search string query, as well as one or more refinements and one or more additional key words.

Refinements can include attributes of objects, such as color, brand name, and material, for example, and key words can include additional search terms that can be used as search parameters with the generated search string query. Refinements additionally can include exclusions, e.g., products that are not part of a certain brand. Further, refinements can vary by object category, and an individual refinement can have varied levels of relative importance for different object categories. For example, color may be of greater significance for shoes than for cameras. Refinements also can include attributes of objects related to the item of interest even when they are not attributes of the item itself.

A search using the search string query, refinements, key words, and category as parameters is performed, and a set of search results are determined. The search results can be displayed on a client device, such as a portable computing device, and a user of the client device can select whether to apply the category, refinements, and key words to the search results to limit or filter those results that are displayed.

Prior to performing the search using the search string query, refinements, key words, and category as parameters, some or all of the search parameters can be displayed to the user 102 to ensure that the search parameters relate to the correct object of interest. For example, the user might want to search for the camera 122 in the example situation 140 illustrated in FIG. 1C. If the user 102 inadvertently aims the field of view 108 too low, however, the search parameters might instead relate to the table 124. A misguided search can be avoided by displaying some or all of the search parameters that will be used for a search, such as search parameters 142, prior to initiating the search. The user 102 then can move the computing device 104 to reposition the field of view 108 until the appropriate search parameters, such as search parameters 152, are displayed, as illustrated in example situation 150 in FIG. 1D. When the appropriate search parameters are displayed, the user 102 can initiate the search, such as by selecting a pause button 144. A search using the parameters then is performed, and a set of search results are determined. The search results can be displayed on a client device, such as a portable computing device, and a user of the client device can select whether to apply the category, refinements, and key words to the search results to limit or filter those results that are displayed.

Figure 1E:
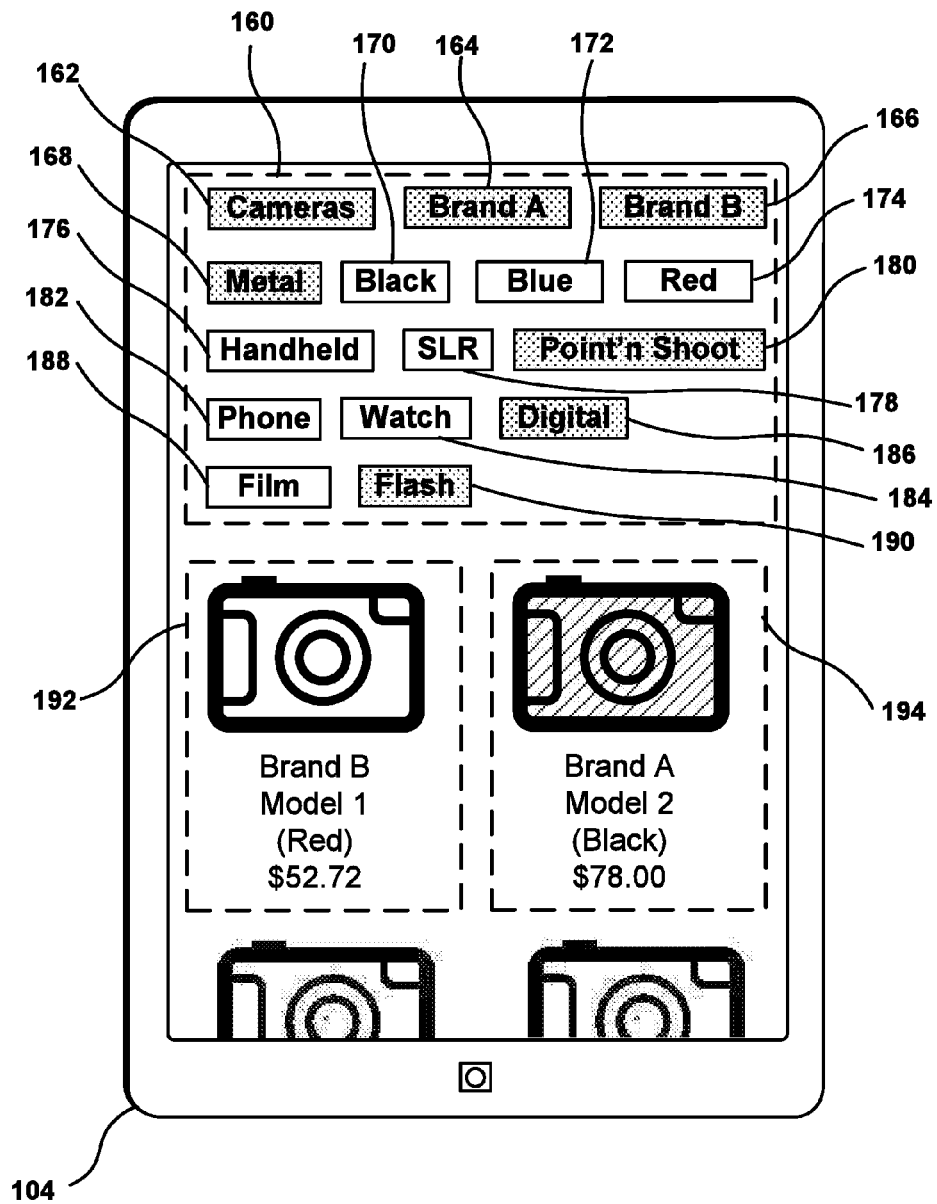
Figure 1F:
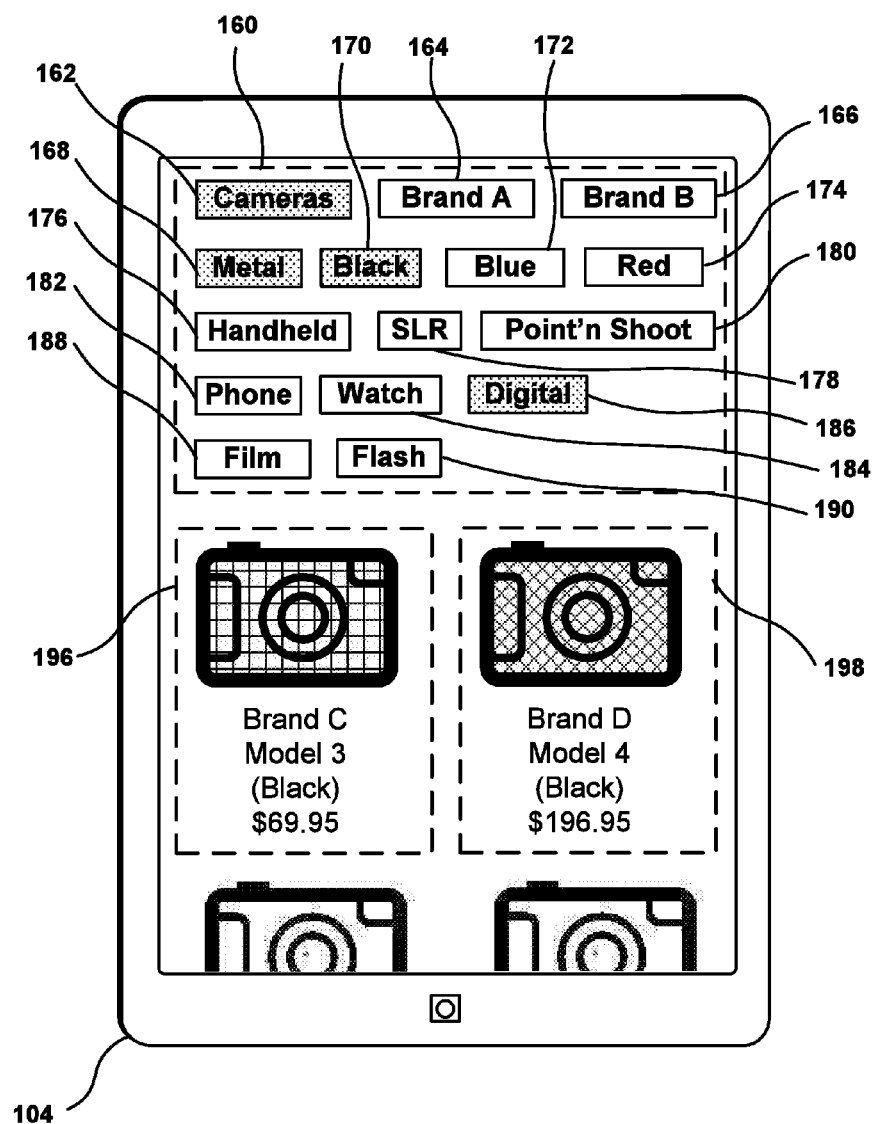

For example, search results 192 and 194 are displayed on the portable computing device 104 illustrated in FIG. 1E. Each search result can include an image of a product and information about the product, such as brand, model, price, and features. In addition to search results, other selectable options 160 can be displayed. These selectable options 160 can include one or more product categories (such as "Cameras" 162), as well as one or more key words and one or more refinements (such as "Brand A" 164, "Brand B" 166, "Metal" 168, "Black" 170, "Blue" 172, "Red" 174, "Handheld" 176, "SLR" 178, "Point'n Shoot" 180, "Phone" 182, "Watch" 184, "Digital" 186, "Film" 188, and "Flash" 190). A user can choose whether to apply each of the selectable options 160 to the displayed search results, such as by tapping an option to select or, alternatively, de-select the option. For example, "Brand A" 164, "Brand B" 166, "Metal" 168, "Point'n Shoot" 180, "Digital" 186, and "Flash" 190 are applied to filter the search results so that search result 192 and search result 194 are displayed in FIG. 1E. If the user changes the selected options, the displayed search results can change, as illustrated in FIG. 1F. "Brand A" 164, "Brand B" 166, "Point'n Shoot" 180, and "Flash" 190 have been de-selected, and "Black" 170 has been selected. Search result 196 and search result 198 are displayed because they satisfy the modified parameters. An initial set of the selectable options 160 that are most likely to be relevant to the search parameters can be selected upon initial display of the search results to the user. In addition to or as an alternative to selecting from among the selectable options 160, a user also can edit text associated with the search query. Although the selectable options 160 are illustrated as being positioned in an upper portion of the display screen of the computing device 104, it should be understood that such selectable options 160 can be positioned in other positions, as well, such as near a bottom portion of the display screen.

As mentioned, a neural network-based approach can be used to train a first classifier algorithm on one or more categories (e.g., apparel, shoes, etc.). For example, a CNN can be trained on a similar data set (which includes dress, pants, watches, etc.) so that it learns the best feature representation for this type of image. Trained CNN is used as a feature extractor: an input image is passed through the network and intermediate outputs of layers can be used as feature descriptor of the input image. Similarity scores can be calculated based on the distance between the one or more feature descriptors and the one or more candidate content feature descriptors and used in a categorization tree.

A content provider can thus analyze a set of images to determine a probability that a respective image includes an instance of a particular category. For example, for an image, the first classifier algorithm can be configured to analyze at least a portion of the image. The classifier can generate, for each analyzed image, a feature vector, categorization value, weighting, or other score that indicates a probability that a respective image includes an instance of a certain category. A category can refer to, for example, a class or division of items regarded as having particular shared characteristics. An example category can be Sports and Outdoors, Beauty, Health and Grocery, Books, Movies, Music and Games, Clothing, Shoes, and Jewelry, among others.

The feature vector can include an entry (i.e., a probability) for each of the categories the first classification algorithm is trained to recognize. The probabilities can be utilized to generate a probability distribution of output category data. For an item of interest represented in a query image, the category of the item can be determined. In accordance with various embodiments, information is often organized according to a defined taxonomy or classification. For example, a content provider (e.g., an online retailer) can organize various products using a navigational hierarchy that categorizes products into to one or more categories. Some of these categories may be sub-categories of a broader category and thus may be nested within one or more broader category. For example, a pair of men's dress shoes may be associated with the classification "Clothing & Shoes," "Men," "Shoes," "Dress Shoes." Further, the category "Dress Shoes" may be nested as a sub-category of the broader category "Shoes," the category "Shoes" may be nested as a sub-category of the broader category "Men," and the category "Men" may be nested as a sub-category of the broader category "Clothing & Shoes." In another example, a content provider may categorize an article about 3D printing under the categories: "Computer printing," "Industrial robotics," "3D Manufacturing," and any of these categories may be sub-categories of another.

In a second step, a neural network-based approach can be used to train a second classifier algorithm on descriptions of images (e.g., captions). For example, an RNN can be trained on a data set that includes images and descriptions of the respective images. The RNN then can use a predicted feature vector to begin generating words in an attempt to output an appropriate word or sequence of words to describe the image. Each module in the RNN can be a replicated neural network, and each previously generated word can be used to generate a next word. The image and the previous word are used as inputs to the RNN, which then predicts the next word.

Figure 2:
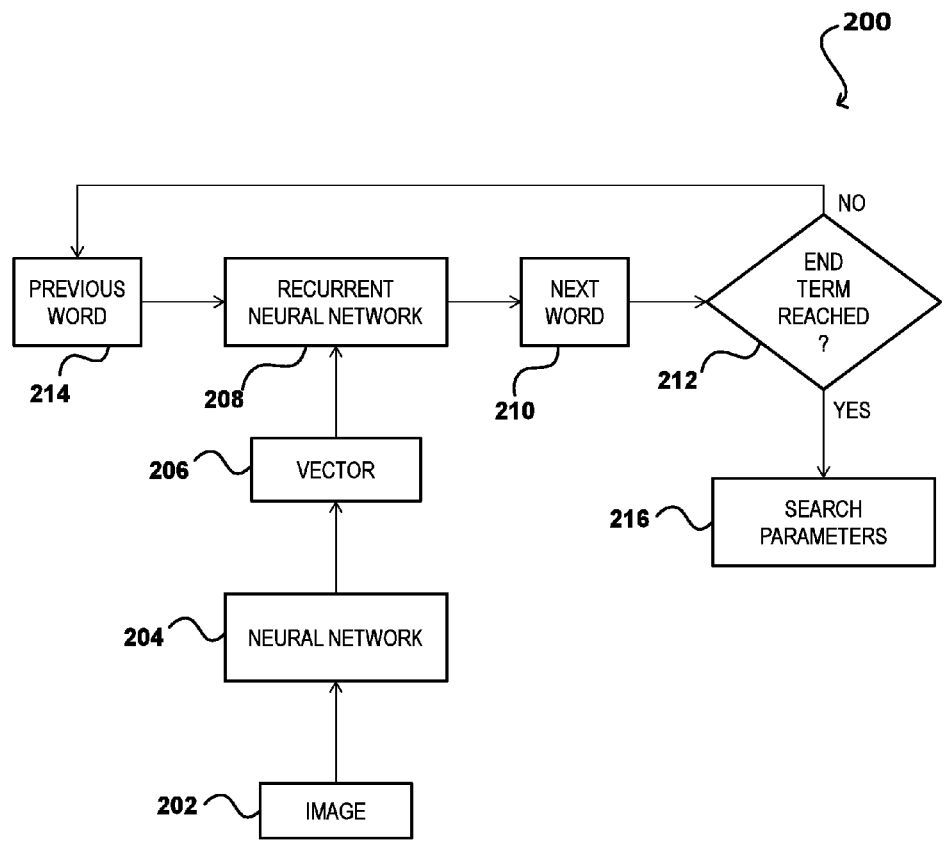
FIG. 2 illustrates an example process for generating a search string and refinements that can be utilized in accordance with various embodiments.

As shown in example process 200 illustrated in FIG. 2, an image 202 can be used to attempt to predict a sequence of words or terms that describe an object represented in the image 202. A neural network 204, such as a convolutional neural network, takes the image 202 and converts into a feature vector 206. The feature vector 206 combines with a previously predicted word 214 in the recurrent neural network 208 to predict the next word 210. Then, the next word 210 is analyzed to determine whether it is an end term 212. If the next word 210 is an end term 212, the next word 210 is used to determine search parameters 216 for a search. If the next word 210 is not an end term 212, it becomes the previous word 214 and is used, with the feature vector 206 in the recurrent neural network 208, to predict the next word 210. The process of generating the next word 210 based on the feature vector 206 and the previous word 214 repeats until the next word 210 becomes an end term. Each of the previous word and the next word can be predicted word vectors, i.e., probability distributions over possible letters and/or words that can be found at each point in the sequence.

Figure 3:
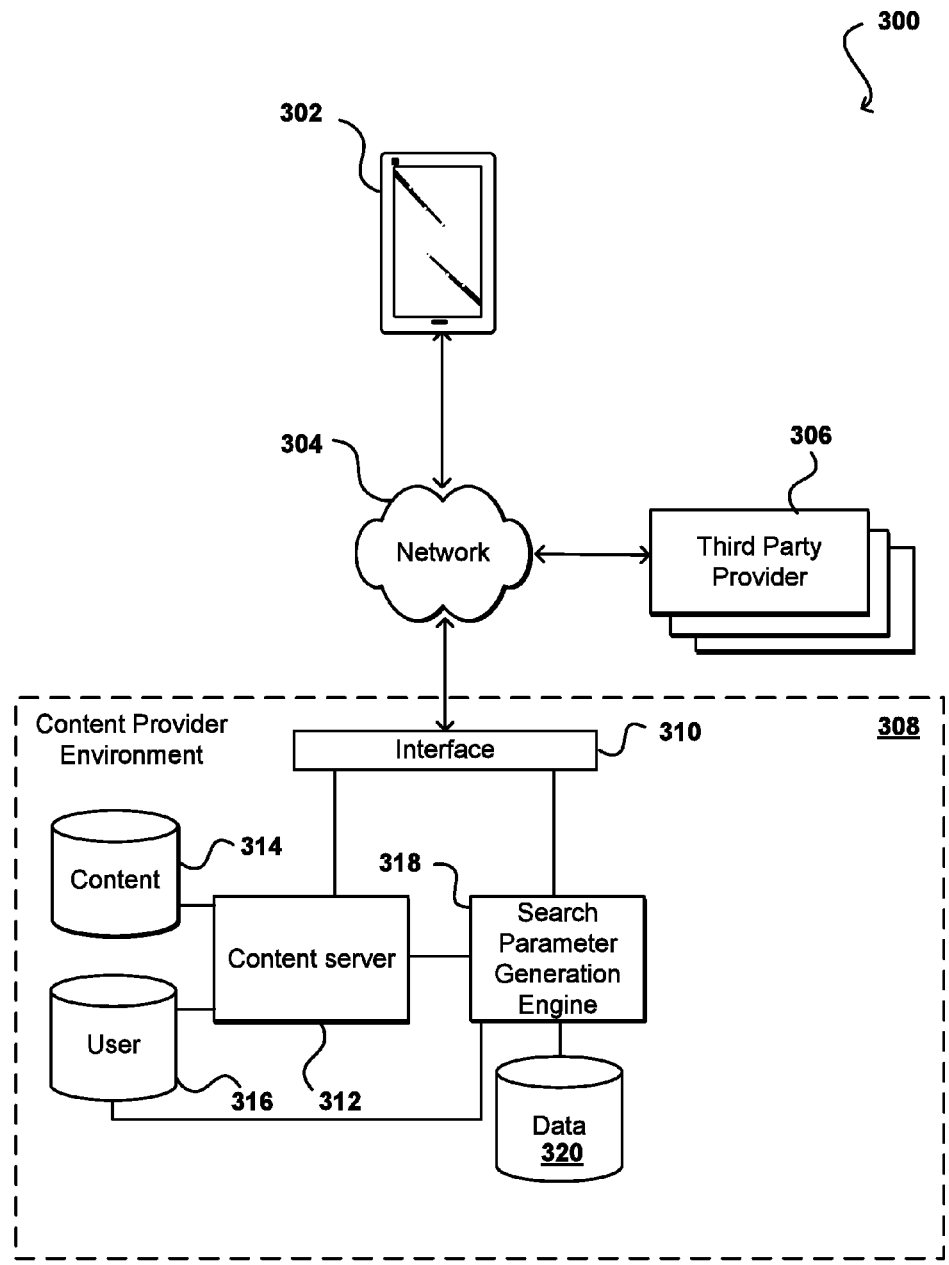
FIG. 3 illustrates an example environment in which aspects of the various embodiments can be implemented.

FIG. 3 illustrates an example environment 300 in which various embodiments can be implemented. In this example, a user is able to use a client device 302 to submit a request for content, such as a webpage or page of an electronic book, across at least one network 304. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses), and portable media players, among others. The at least one network 304 can include any appropriate network, such as may include the Internet, an Intranet, a local area network (LAN), a cellular network, a Wi-Fi network, and the like. The request can be sent to an appropriate content provider environment 308, which can provide one or more services, systems, or applications for processing such requests. The content provider can be any source of digital or electronic content, as may include a website provider, an online retailer, a video or audio content distributor, an e-book publisher, and the like.

In this example, the request is received by a network interface layer 310 of the content provider environment 308. The network interface layer 310 can include any appropriate components known or used to receive requests from across a network, such as may include one or more application programming interfaces (APIs) or other such interfaces for receiving such requests. The network interface layer 310 might be owned and operated by the provider, or leveraged by the provider as part of a shared resource or "cloud"

offering. The network interface layer 310 can receive and analyze the request from the client device 302 and cause at least a portion of the information in the request to be directed to an appropriate system or service, such as a content server 312 (e.g., a Web server or application server), among other such options. In the case of webpages, for example, at least one server 312 might be used to generate code and send content for rendering the requested Web page. In cases where processing is to be performed, such as to generate search results, perform an operation on a user input, identify content represented in images, etc., information might also be directed to at least one other server for processing. The servers or other components of the environment might access one or more data stores, such as a user data store 316 that contains information about the various users, and one or more content repositories 314 storing content able to be served to those users.

As mentioned, in at least some embodiments the content to be provided can include data 320 for training classifiers on object categories and descriptions of images, or other such elements that are selected based on information for the user associated with the request, for example by providing information to a search parameter generation engine 318 or other such component or service, for analyzing the provided information and attempting to generate search parameters such as queries, refinements, or key words, or other elements as discussed herein. In some embodiments, this can utilize content generated within the content provider environment 308 or received from one or more third party providers 306, among other such options. For example, queries, refinements, or key words can be generated using a collection of content obtained within the environment (such as data 320) or received from the third party providers 306. A content manager or other such component or service can analyze an image to determine product categories, queries, refinements, and key words that correspond to individual items that have data stored in the content repository 314 or elsewhere in the content provider environment 308. This can include, for example, items available for consumption.

Figure 4:
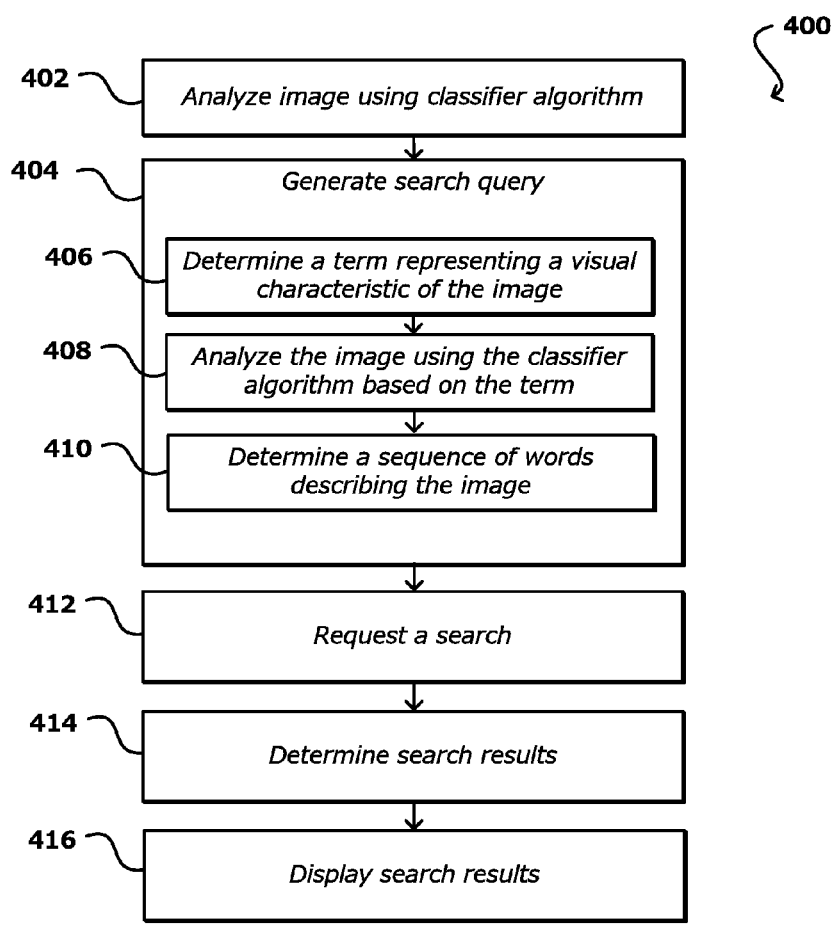
FIG. 4 illustrates an example process for generating a search string and refinements that can be utilized in accordance with various embodiments.

FIG. 4 illustrates an example process 400 for generating a search string and refinements that can be utilized in accordance with various embodiments. It should be understood that there can be additional, fewer, or alternative steps performed in similar or alternative orders, or in parallel, within the scope of the various embodiments unless otherwise stated. In this example, an image that includes a representation of an item of interest is analyzed 402 using a classifier algorithm. The classifier algorithm can be trained on a set of images and accompanying descriptions of the images. Based on the analysis, a search query is generated 404. Generating a search query 404 can include sub-steps. For example, a term representing a visual characteristic of the image is determined 406. The image is again analyzed 408 using the classifier algorithm based on the determined term. A sequence of words describing the image is determined 410. The sequence of words includes a description of the item of interest represented in the image, including characteristics of the item of interest. Using such a description, a search query is generated 404, and a search is requested 412. In response to the requested search, search results are determined 414 and displayed 416.

Figure 5:
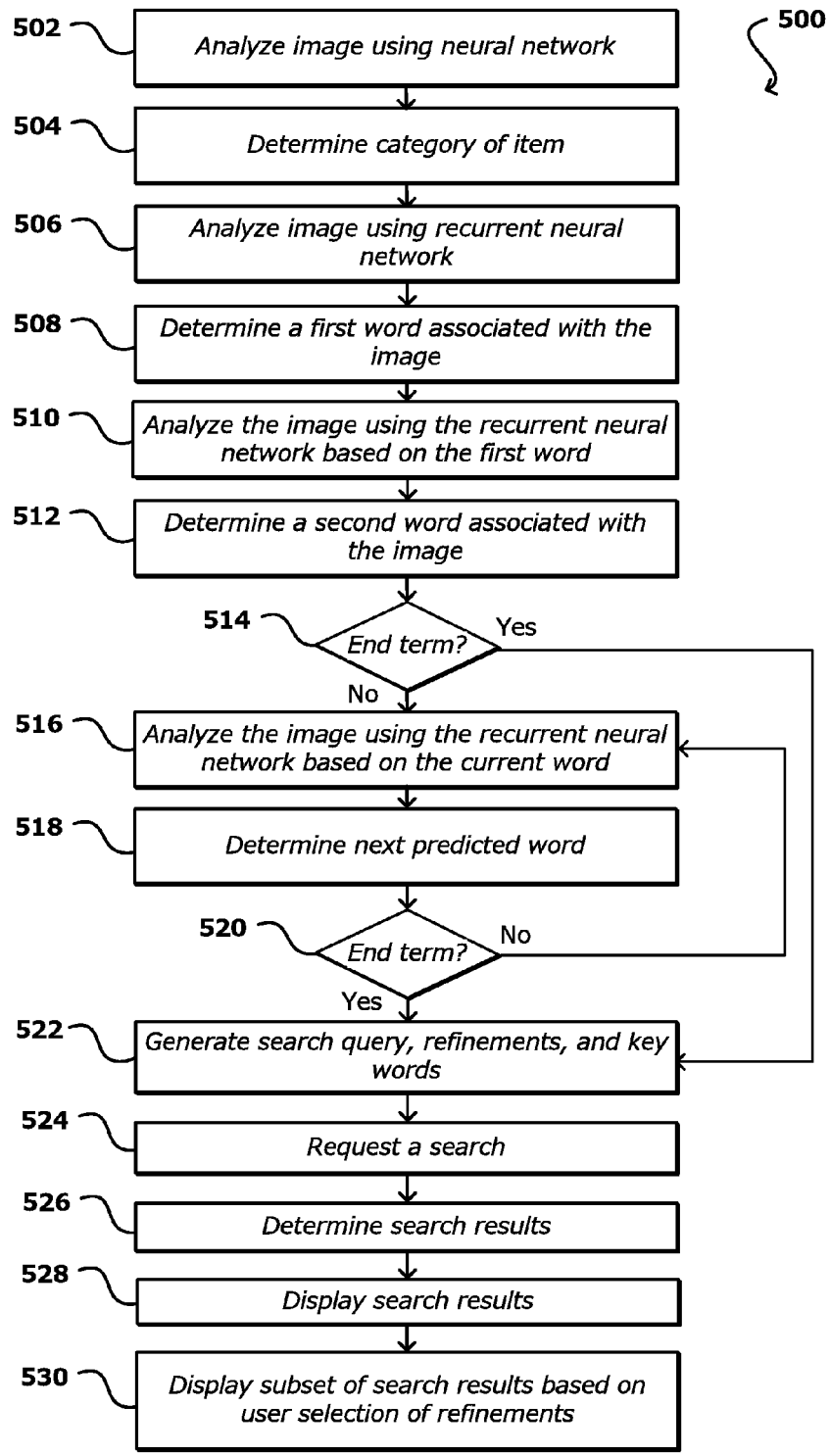
FIG. 5 illustrates an example process for generating a search string and refinements based on information about specific items represented in an image that can be utilized in accordance with various embodiments.

FIG. 5 illustrates another example process 500 for generating a search string and refinements that can be utilized in accordance with various embodiments. In this example, an image that includes a representation of an item of interest is analyzed 502 using a neural network to determine 504 a category of the item of interest, for example, using a feature vector. The image is then analyzed 506 using a recurrent neural network. Based on the analysis, a first word associated with the image is determined 508. Then, the image is again analyzed 510 using the recurrent neural network based on the first word and the category to determine 512 a second word associated with the image. The second word can be analyzed to determine whether the second word is an end term at step 514. An end term can include a description of the item of interest represented in the image, including characteristics of the item of interest. If the second word is an end term 514, a search query, one or more refinements, and one or more key words can be generated 522 based on the description of the item. If the second word is not an end term 514, the image is again analyzed 516 using the recurrent neural network based on the second word and the category to determine 518 a next predicted word associated with the image. The next word can be analyzed to determine whether the next word is an end term at step 520. If it is an end term 520, a search query, one or more refinements, and one or more key words can be generated 522 based on the description of the item. Otherwise, the image can again be analyzed 516 based on the category and the previous word to determine 518 the next predicted word until an end term is generated. After generating 522 a search query, one or more refinements, and one or more key words, a search can be requested 524, and search results can be determined 526. The search results then can be displayed 528. Further, a subset of the search results can be displayed 530 based on the user's selection of refinements. A subset of the search results also can be displayed based on the user's de-selection of refinements and the user's selection or de-selection of key words, as well as the user's editing the search query. Alternatively, after generating 522 search parameters, a second set of search parameters (e.g., a second search string query, a second set of one or more refinements, and a second set of one or more key words based on the characteristics of the object) can be generated. Further, a second set of search results corresponding to the second search parameters can be determined. If the second set of search results is more closely associated with the object than the first set of search results, the second set of search results can be displayed to the client device. The second set of search results similarly can be filtered such that only a subset of the second set of search results are displayed based on the user's selection or de-selection of search parameters.

Multiple sets of search parameters similarly can be generated, and the set of search parameters used for the displayed search results can be the set of search parameters that produces the most relevant search results. For example, a set of search parameters that produces many search results may be preferred to another set of search parameters that does not produce any search results. Some embodiments can enable a use to select a set of search parameters from a list of possible sets of search parameters before displaying any search results.

Figure 6:
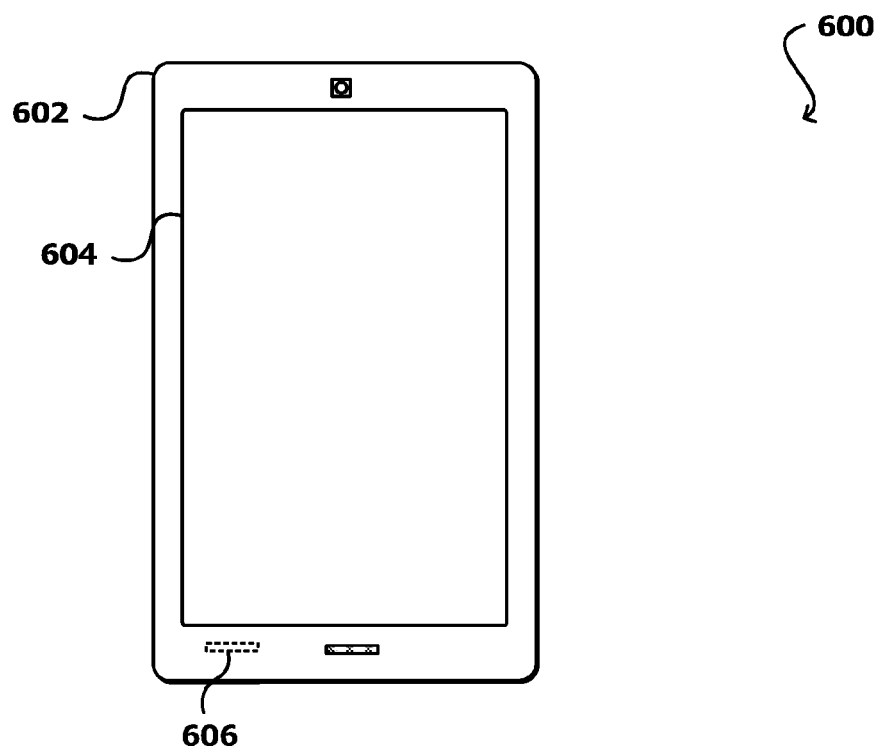
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 602 has a display screen 604 on the front side, which under normal operation will display information to a user facing the display screen (e.g., on the same side of the computing device as the display screen). It should be understood that computing devices such as servers, however, may not have dedicated display elements. The example computing device 600 also includes at least one networking component 606, such as a network interface card, wireless networking component, and the like, enabling the computing device to communicate information over at least one network.

Figure 7:
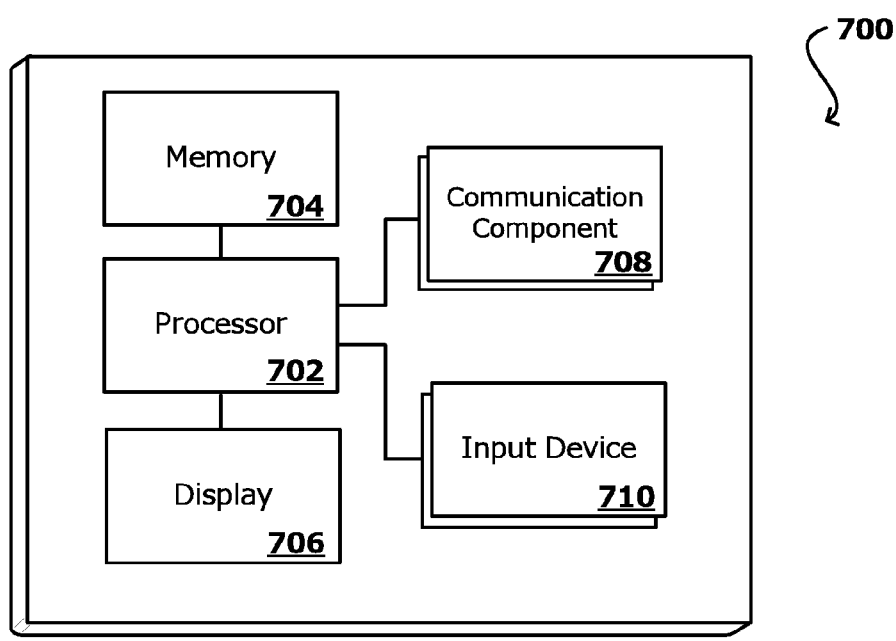
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device 700 includes a processor 702 for executing instructions that can be stored in a memory device or element 704. As would be apparent to one of ordinary skill in the art, the device 700 can include many types of memory, data storage, or non-transitory computer-readable storage media, such as a first data storage for program instructions for execution by the processor 702, a separate storage for images or data, a removable memory for sharing information with other devices, etc. The device 700 typically will include some type of display element 706, such as a touch screen or liquid crystal display (LCD), although devices such as portable media players might convey information via other means, such as through audio speakers. In some embodiments, the computing device 700 of FIG. 7 can include one or more networking and/or communication elements 708, such as a Wi-Fi, Bluetooth, RF, wired, or wireless communication system. The device 700 in many embodiments can communicate with a network, such as the Internet, and may be able to communicate with other such devices. In some embodiments the device 700 can include at least one additional input component 710 able to receive conventional input from a user. This conventional input can include, for example, a push button, touch pad, touch screen, wheel, joystick, keyboard, mouse, keypad, or any other such device or element whereby a user can input a command to the device 700. In some embodiments, however, such a device 700 might not include any buttons at all, and might be controlled only through a combination of visual and audio commands, such that a user can control the device 700 without having to be in contact with the device 700.

Figure 8:
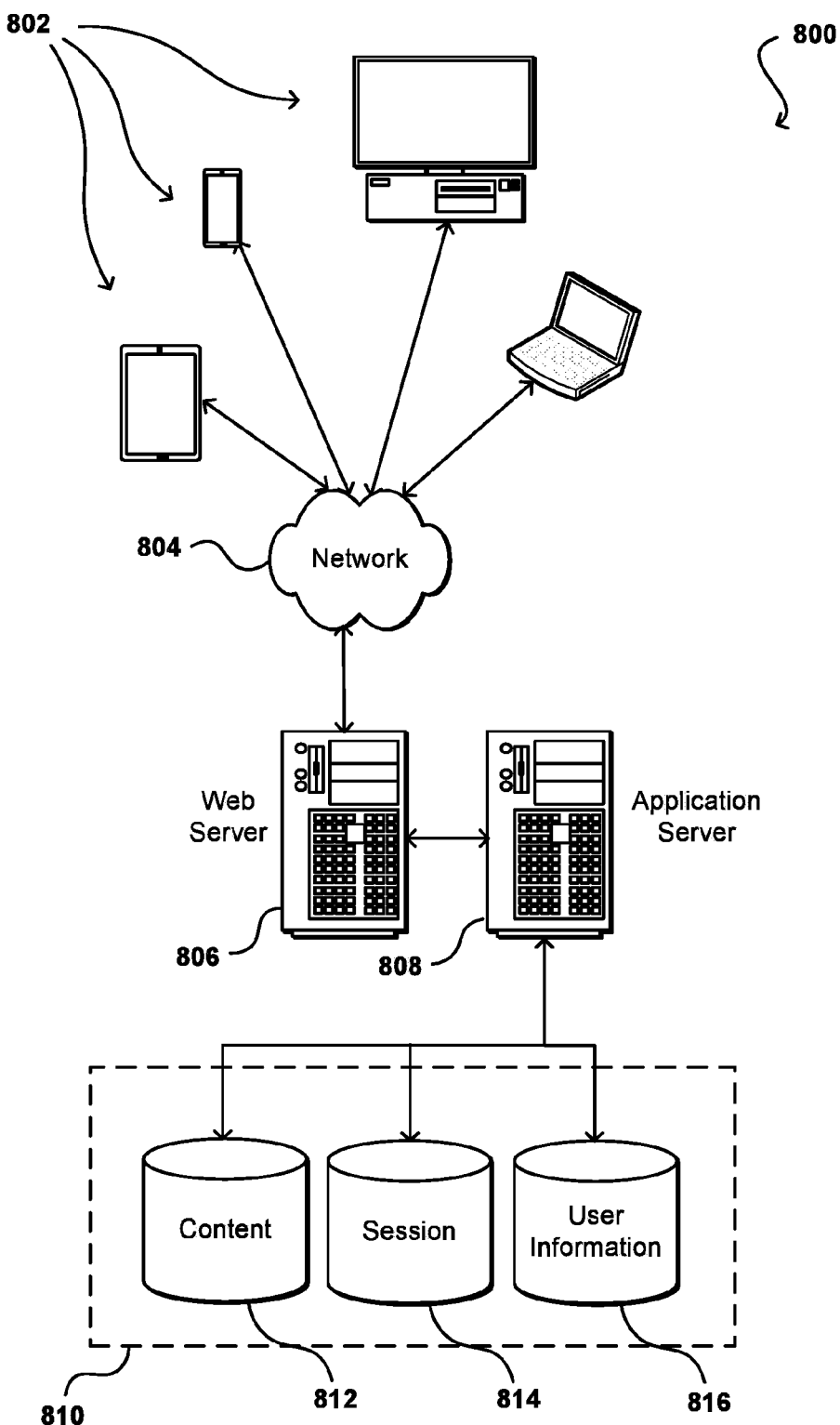
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages, or information over an appropriate network 804 and convey information back to a user of the device. Examples of such client devices 802 include personal computers, cell phones, handheld messaging devices, laptop computers, set-top boxes, personal data assistants, electronic book readers, and the like. The network 804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network 804 can be enabled via wired or wireless connections and combinations thereof. In this example, the network 804 includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 808 can include any appropriate hardware and software for integrating with the data store 810 as needed to execute aspects of one or more applications for the client device 802 and handling a majority of the data access and business logic for an application. The application server 808 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store 810 illustrated includes mechanisms for storing production data 812 and user information 816, which can be used to serve content for the production side. The data store 810 also is shown to include a mechanism for storing log or session data 814. It should be understood that there can be many other aspects that may need to be stored in the data store 810, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of element. In this case, the data store 810 might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining an image by a camera of a computing device, the image including a representation of an object;
analyzing the image to determine a product category associated with the object;
analyzing the image using a classifier algorithm to determine a first term representing a first visual characteristic of the image;
analyzing the image using the classifier algorithm with the first term to determine a second term representing a second visual characteristic of the image, the second term including one or more words;
determining that the one or more words of the second term is a sequence of words describing visual characteristics associated with the object, the sequence of words satisfying a search condition;
generating, in response to the sequence of words satisfying the search condition, a search string query, one or more refinements, and one or more key words based at least in part on the product category and the sequence of words;
determining a set of search results corresponding to the search string query; and
displaying the set of search results with the one or more refinements and the one or more key words for the product category on the computing device, the one or more refinements and the one or more key words configured to be selectable by a user of the computing device, the search string query being configured to be editable by the user in response to a selection of one of the one or more refinements and the one or more key words.

2. The computer-implemented method of claim 1, further comprising:
analyzing the image using a recurrent neural network; and
training the recurrent neural network using descriptions of a set of images to predict strings of terms associated with images.

3. The computer-implemented method of claim 1, further comprising:
training a neural network to predict feature vectors associated with images, the feature vectors describing categories of objects;
analyzing the image using the neural network to generate a feature vector that represents the product category associated with the object; and
analyzing the image using the classifier algorithm to determine the second term based at least in part on the first term and the feature vector.

4. The computer-implemented method of claim 1, wherein the set of search results is a first set of search results, and wherein the method further comprises:
generating a second search string query, a second set of one or more refinements, and a second set of one or more key words based on characteristics of the object;
determining a second set of search results corresponding to the second search string query, the product category, the second set of one or more refinements, and the second set of one or more key words;
determining that the second set of search results is more closely associated with the object than the first set of search results; and
displaying the second set of search results to the computing device.

5. A computer-implemented method, comprising:
analyzing an image including a representation of an object using a first classifier to determine a product category associated with the object;
analyzing the image using a second classifier algorithm to determine a term representing a visual characteristic of the image;
analyzing the image using the second classifier algorithm with the term to determine a sequence of words describing visual characteristics associated with the object;
determining that the sequence of words satisfies a search condition;
generating, in response to the sequence of words satisfying the search condition, a search string query that includes a subset of the sequence of words and search string refinement terms associated with the product category and the sequence of words;
determining a set of search results based at least in part on the search string query that includes an item from a catalog of items; and
displaying the set of search results and the search string refinement terms on a computing device, the search string refinement terms being selectable, the search string query being configured to be editable in response to a selection of one of the search string refinement terms.

6. The computer-implemented method of claim 5, further comprising:
causing the search string query to be transmitted to obtain the set of search results.

7. The computer-implemented method of claim 5, further comprising:
analyzing the image using the second classifier algorithm to determine the sequence of words further based at least in part on the product category.

8. The computer-implemented method of claim 5, wherein the set of search results is a first set of search results, and wherein the method further comprises:
generating a second search string query, an additional set of search string refinement terms based on the visual characteristics of the object;
determining a second set of search results corresponding to the second search string query; and
displaying the second set of search results and the additional set of search string refinement terms to the computing device.

9. The computer-implemented method of claim 5, further comprising:
displaying a subset of the set of search results on the computing device in response to one or more of: a selection of a search string refinement term and an edit of the search string query by a user.

10. The computer-implemented method of claim 5, further comprising:
obtaining a plurality of images;
analyzing the plurality of images to determine a description associated with respective images of the plurality of images; and
training a recurrent neural network using the plurality of images and associated descriptions to determine words representing visual characteristics in the plurality of images.

11. The computer-implemented method of claim 5, further comprising:

training a neural network to predict feature vectors associated with images, a feature vector describing a categories of an object represented in an image;
analyzing the image using the neural network to generate a feature vector that represents the product category associated with the object; and
analyzing the image using the second classifier algorithm to determine the sequence of words based at least in part on the term and the feature vector.

12. A system, comprising:
at least one processor; and
memory including instructions that, when executed by the at least one processor, cause the system to:
   analyze an image including a representation of an object using a first classifier to determine a product category associated with the object;
   analyze the image using a second classifier algorithm to determine a term representing a visual characteristic of the image;
   analyzing the image using the second classifier algorithm with the term to determine a sequence of words describing visual characteristics associated with the object;
   determine that the sequence of words satisfies a search condition;
   generate, in response to the sequence of words satisfying the search condition, a search string query that includes a subset of the sequence of words and search string refinement terms associated with the product category and the sequence of words;
   determine a set of search results based at least in part on the search string query that includes an item from a catalog of items; and
   display the set of search results and the search string refinement terms on a computing device, the search string refinement terms being selectable, the search string query being configured to be editable in response to a selection of one of the search string refinement terms.

13. The system of claim 12, wherein the instructions further cause the system to:
   cause the search string query to be transmitted to obtain the set of search results; and
   display the set of search results on a computing device, the search string query being configured to be editable by a user.

14. The system of claim 12, wherein the instructions further cause the system to:
   determine a product category associated with the object; and
   analyze the image using the second classifier algorithm to determine a sequence of words based at least in part on the term and the product category.

15. The system of claim 14, wherein the instructions further cause the system to:
   generate one or more refinements and one or more key words based on the visual characteristics of the object; and
   determine a set of search results associated with the product category in response to the search string query; and
   display with the set of search results the one or more refinements and the one or more key words on a computing device.

16. The system of claim 15, wherein the instructions further cause the system to:
   display the set of search results with the one or more refinements and the one or more key words for the product category on the computing device, the one or more refinements and the one or more key words configured to be selectable by a user of the computing device, the search string query being configured to be editable by the user in response to a selection of one of the one or more refinements and the one or more key words.

17. The system of claim 16, wherein the set of search results is a first set of search results, and wherein the instructions further cause the system to:
   generate a second search string query, a second set of one or more refinements, and a second set of one or more key words based on the visual characteristics of the object;
   determine a second set of search results corresponding to the second search string query, the product category, the second set of one or more refinements, and the second set of one or more key words;
   determine that the second set of search results is more closely associated with the object than the first set of search results; and
   display the second set of search results to the computing device.

* * * * *